P. GUTWEIN, JR.
DRAINAGE LEVEL.
APPLICATION FILED FEB. 4, 1910.
Reissued May 16, 1911. 13,240.
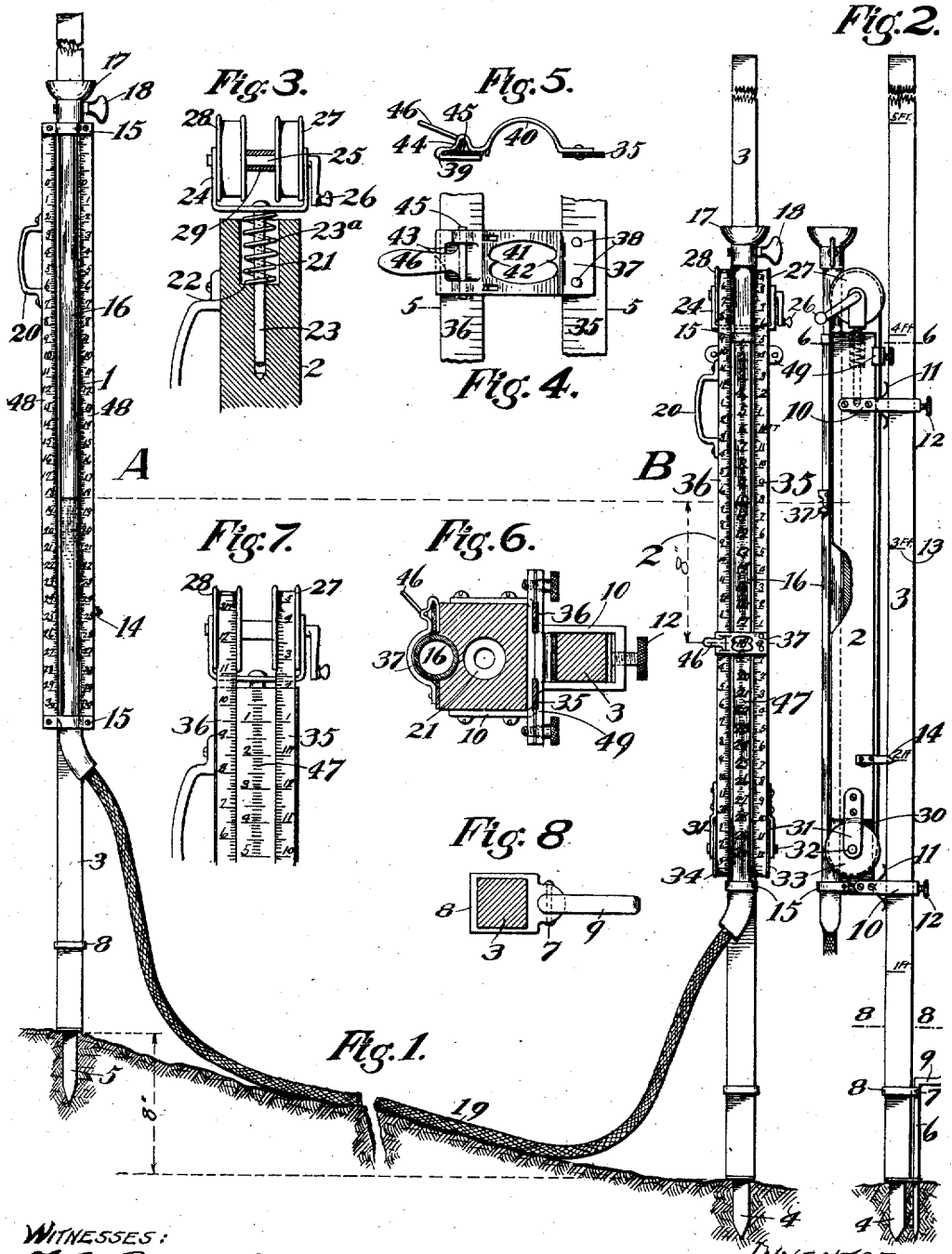
WITNESSES:
F. C. Barry
Amos W. Hart
INVENTOR:
Phillip Gutwein Jr.
BY Munn & Co.
ATTORNEYS
THE NORRIS PETERS CO., WASHINGTON, D. C.

UNITED STATES PATENT OFFICE.

PHILLIP GUTWEIN, JR., OF FRANCESVILLE, INDIANA.

DRAINAGE-LEVEL.

13,240. Specification of Reissued Letters Patent. Reissued May 16, 1911.

Original No. 914,945, dated March 9, 1909, Serial No. 450,149. Application for reissue filed February 4, 1910. Serial No. 542,155.

*To all whom it may concern:*

Be it known that I, PHILLIP GUTWEIN, Jr., a subject of the Emperor of Austria-Hungary, residing at Francesville, in the county of Pulaski and State of Indiana, have invented certain Improvements in Drainage-Levels; and I do hereby declare the following to be a full description of the invention.

The invention is a hydrostatic apparatus which includes two instruments having suitable graduations to indicate height in inches, and provided with glass tubes which are connected by a flexible tube, the three tubes being, in practice, partly filled with a liquid whose level, in the respective instruments, indicates the difference of elevation between the stations or places where the said instruments are located. Movable or adjustable measuring scales in the form of tapes, graduated in inches, are arranged on one of the instruments alongside of the glass tube of the same, and constitute a part of the operative mechanism. Carrying rods or staffs serve as supports for the chief working parts of the apparatus.

The construction, combination, and operation of the apparatus are as hereinafter described and the novel features specifically indicated.

In the accompanying drawings:—Figure 1 is an elevation of the apparatus taken as a whole, the two instruments before referred to being set in operative position. Fig. 2 is a side elevation of one of the instruments, a portion being broken away to show the interior construction. Fig. 3 is a vertical section, illustrating the construction of the head or upper portion of one of the instruments. Fig. 4 is a face view of a portion of the two graduated tapes and the indicator employed in connection therewith. Fig. 5 is a cross section on the line 5—5 of Fig. 4. Fig. 6 is a cross section on the line 6—6 of Fig. 2. Fig. 7 is a face view of the upper portion of one of the instruments, without the glass tube which normally forms a part thereof. Fig. 8 is a cross section at 8—8 of Fig. 2.

For convenience of reference and to enable the construction and operation of the apparatus to be more easily and clearly understood, I indicate the two instruments, in the drawings, by capital letters, A and B, respectively. In the left-hand instrument A, the numeral 1 denotes a block or bar, and in the right-hand instrument, B, 2 denotes an essentially similar block or bar. In order that these blocks 1 and 2, with the glass tubes secured thereto, may be only of such a length as required by the ordinarily occurring elevational differences, say within one hundred feet, in the general practice to farm drainage-surveying and to maintain, at the same time, the possibility to take surveys between points of greater than ordinary elevational differences, in one setting, each of said blocks 1 and 2 is adapted to be held by a longer carrying rod 3. On these carrying rods the blocks, in practice, may be adjusted to any height convenient to the operators; where the difference in altitude between points, as marked by stakes 4 and 5 in Fig. 1, is greater than the liquid in the glass tubes 16 can indicate, one block 2 may be raised by an even number of feet and the other block 1 may be lowered, if necessary, until the balance of the difference in altitude can be read, as normally, from tape 35. Of course, the even number of feet, by which the blocks were raised and lowered must be added to the said balance.

The lower end of the carrying rod 3 is provided with an anchoring pin 6 that passes through a perforated ear projecting from a collar 8 embracing the carrying rod 3, the pin and collar being secured together by a rivet 7, Fig. 8. The upper end portion of the pin 6 above the collar 8 is bent at approximately right angles to provide an operating handle 9. To anchor the carrying rod 3 in position, it is only necessary that pressure be given by the foot on the part 9 to force the pin 6 into the ground. Each instrument is provided with straps 10—see Fig. 2—which pass around the carrying rod 3 and the said instrument is provided with the leaf springs 11 which are adapted to contact with the carrying rod 3 to frictionally hold the block against movement thereon. The straps 10 have winged screw-bolts 12 which bear on the carrying rod 3, to insure due pressure and friction. In order that the position of the instrument on the carrying rod 3 may be determined, said rod is provided with the indications 13 having acting in conjunction therewith the pointer or indicator 14 carried by the instrument adjacent the lower end thereof.

Each of the blocks 1 and 2 has held to the face thereof by the straps 15, a glass tube 16 extending longitudinally thereof. The upper end of the tube has fixed thereto the cup 17, with stop-cock 18, so that suitable liquid may be poured into the tube. The lower ends of the tubes 16 are united by a flexible tube 19 making a continuous passage of the fluid from one of the tubes 16 to the other, and it is the relative positions of the fluid within the tubes that determines the per cent. of the grade, or difference in elevation.

Each of the blocks 1 and 2, has fixed to the side thereof adjacent to the top, a hand grasp 20 to permit the proper manipulation of the instrument and to afford convenient means for carrying the same. The block 2 has formed in its upper end, the recess 21, providing a shoulder 22. Projecting within the recess 21 is a stem 23 arranged centrally of a fork or bracket 24 and encircling said stem is a helical spring 23[a]. In the free end portion of the bracket is mounted a shaft 25, projecting beyond the bracket and to this projecting portion is fixed a rotating medium 26, in this instance shown as a crank. Fixed to the shaft 25, adjacent to one end thereof, is the flanged pulley 27, while loosely mounted on the opposite end is a second flanged pulley 28. A sleeve 29 prevents the pulley 28 sliding on the shaft. The lower end 30 of the block 2 has arms or brackets 31 in which is mounted the shaft 32, carrying the flanged pulleys 33 and 34 arranged in alinement with the pulleys 27 and 28, respectively. Said pulleys 33 and 34 are loosely mounted on the shaft 32.

Over the pulleys 27 and 33 passes an endless tape 35, while the pulleys 28 and 34 have traveling thereover a second endless tape 36. By the just described movable arrangement of the measuring scales or tapes 35 and 36 it results that the difference in altitude between two points can be read directly from tape 35 in feet and fractions thereof, upon performing a single adjustment, omitting all computations. Upon performing an additional adjustment, as will be explained later, the aforesaid difference in altitude is indicated on tape 36, which being automatically moved in one direction,—if the difference in altitude is a rise,—and in the other direction, if it be a fall, thus indicates a total difference in elevation from starting point or height above a so-called datum-line, extending horizontally at an elevation 0.00. Furthermore, by the above described arrangement of tapes, the aforesaid adjustments for effecting such results can be made independent of the liquid-holding tubes 16 and without changing their positions whatever, thus overcoming the usual continuous disturbance of the liquid and relative change of the liquid-level in the tubes, while making such adjustments. The tape 35 is numbered from a point "O" in opposite directions for the purpose of indicating a rise above and a fall below the said point "O", and at this point is fixed an indicator 37, it being secured to the tape 35 by rivets 38 at one end portion, while its opposite portion is bent, as at 39, to straddle the tape 36. The intermediate portion 40 of the indicator or plate is bowed to pass the tube 16, as shown in Fig. 5, and this bowed portion 40 is provided with an oval opening 41, having the opposed inwardly extending points 42 at the ends thereof, and which are intended to be used in connection with indications 47 beneath the glass tube 16, Fig. 7. The upper face of the plate or indicator is slit as at 43 to permit the formation of the bearings 44. In the bearings 44 are inserted the trunnions 45 of the cam-lever 46 which is intended to clamp the indicator or plate 37 to the tape 36 to cause said tapes, when desired, to move in unison or simultaneously with the tape 35. The tape 36 is numbered from a point marked "O" continuously in one direction only. It will be noted that by means of the tension of the spring 23[a], the endless tapes 35 and 36 will be held properly stretched upon their carrying pulleys. A clamp 49 is suitably applied to the block 2 of instrument B, near its extreme upper end and comprises plate-like members having spaced apart registering recesses therein, each of the registering recesses being adapted to form a passage for the reception of tapes 35 and 36, respectively, as clearly seen in Fig. 6, said clamp members being held together by means of thumb nut-equipped screws, to clamp one or both tapes in position.

The instrument A does not include tapes, as described in connection with the block 2, the only indicia thereon being those arranged adjacent each side of the tube 16, which correspond to the indications 47 of block 2.

In practice, a proposed drain-line is laid out and stakes 4 and 5 are driven 50 or 100 feet apart and surveying is commenced at the outlet, as usual. Tape 36 is adjusted so it will indicate the elevation of the starting point at the outlet, under clamp 49, whose upper edge serves as an indicator for said tape. Suppose stake 4 be at the outlet, and assuming its elevation to be 0.00 feet, the tape 36 is also adjusted to its "O" indication before surveying is begun. Instrument B is now placed on stake 4, while instrument A is placed on the next stake 5, which suppose to be of a higher elevation than stake 4, as in Fig. 1. The water or other liquid in the tubes 16, 16, 19, will find a level, as indicated by the dotted line on both instruments A and B, and will indicate on scale 48 of instrument A, a reading, in this case 18. Indicator 37 of the tape 35 of instrument B is next adjusted to the corresponding indication 18 of scale 47, and the result sought is indicated by the liquid in the tube of instrument B on tape 35 to be, in this case, 8″. This reading of 8″ constitutes a rise because it is taken from tape above indicator 37. To indicate this rise on the left-hand tape 36, lever 46 of indicator 37 is tightened and the said indicator adjusted to the liquid-surface, as shown in Fig. 2, thereby also moving tape 36 in the proper—adding—direction by 8″. It is obvious that the said tape 36 now indicates, under clamp 49, eight inches, which is the elevation of stake 5 above datum-line and in going forward, so that instrument B will occupy stake 5 and instrument A, the next in the line, it will be seen that tape 36 of instrument B already indicates the elevation of the stake 5 it occupies and will, by repeating the two adjustments just described, disclose the elevation of the stake beyond 5, or in other words a total rise from the starting point 4, while tape 35 will indicate the difference in elevation between stake 5 and the said next stake beyond it only. This operation thus continues until all stakes have been occupied, thus obtaining the elevations above datum-line of all points as well as the rise or fall between the individual points.

Although a single tape 35 or 36 can be used to make a practical drainage level, both tapes are for some purposes desirable since the number of inches indicated on tape 36 can be used to check the readings from tape 35, and it may be sometimes desired to know the difference of elevation between several separate places or stations, while in other cases, it may be desired to know the elevation of the different points or stations with relation to a datum-line.

What I claim is:—

1. A device of the character described, comprising blocks, tubes carried by said blocks and containing fluid, a flexible tube connecting the aforesaid tubes, movable endless tapes, rotatable means applied to said blocks encompassed by said tapes, one of said rotatable means being provided with means adapted to be manually actuated, and one of said blocks having an indicating device for registering with indicia on the tapes.

2. In a device of the character described, the combination of two blocks, tubes to contain fluid carried by said blocks, a flexible tube connecting the tubes of the blocks, tapes which are movable one independently of the other and means for causing said tapes to move in unison.

3. In a device of the character described, the combination of two blocks, tubes to contain fluid carried by said blocks, a flexible tube connecting the tubes of the blocks, movable tapes carried by one of said blocks, and a clamping means for the tapes carried by said block.

4. In a device of the character described, the combination of two blocks, means for holding them adjustably, tubes to contain fluid carried by said blocks, a flexible tube connecting the tubes of the blocks, movable tapes carried by one of said blocks and carrying rods for said blocks, said blocks being adjustably held by the carrying rods.

5. A device of the character described, comprising blocks, each carrying a liquid-containing tube, a flexible tube connecting the aforesaid tubes, one of said blocks being equipped with two endless tapes having certain indicia thereon, means for carrying and rotating said tapes, resilient means for the retention of said rotatable means and tapes in any position in which they may be adjusted.

6. A device of the character described, comprising blocks, liquid-containing tubes arranged upon said blocks, a flexible tube connecting the aforesaid tubes, endless tapes having certain indicia thereon, rotatable means for actuating said tapes, and a clamp applied to one of said blocks and being adapted to clamp said tapes between its members.

7. A device of the character described, comprising block members, liquid containing tubes carried by said block members, a flexible tube connecting the aforesaid tubes, tapes having certain indicia thereon, rotatable means carried by said block members for actuating said tapes, resilient means arranged in connection with one of said block members, for the retention of said rotatable means and tapes in the position to which they may be adjusted, and a clamp applied to one of said blocks and engaging said tapes.

8. A device of the character described, comprising block members, liquid containing tubes arranged upon said block members, a flexible tube connecting the aforesaid tubes, tapes arranged laterally upon one of said blocks, having marked thereon certain indicia, rotatable means for actuating said tapes, resilient means operatively connected with one of said blocks for holding said rotatable means and tapes in a position to which they may be adjusted, an indicator arranged in connection with said tapes, and a clamp for receiving and holding said tapes between its members.

9. A device of the character described, comprising block members, liquid containing tubes arranged upon said block members, a flexible tube connecting the aforesaid tubes, endless tapes arranged laterally upon one of said block members, rotatable means encompassed by said tapes, and adapted for the actuation of said tapes, a clamp applied to one of said blocks for the retention of said tapes in position, and an indicator arranged in connection with one of said blocks and said tapes, having an intermediate bowed portion, said indicator also having a cam lever for retaining the indicator in position with relation to said tapes and the block member equipped with said tapes.

PHILLIP GUTWEIN, Jr.

Witnesses:

H. G. Bolliger,

Paul J. Von Tobel.

---

Copies of this patent may be obtained for five cents each, by addressing the "Commissioner of Patents, Washington, D. C."

---